United States Patent [19]

Justus et al.

[11] Patent Number: 5,867,329
[45] Date of Patent: Feb. 2, 1999

[54] MULTIPLE-PASS REFLECTION FILTER

[75] Inventors: Brian L. Justus; Alan L. Huston, both of Springfield, Va.

[73] Assignee: The United States of America as represented by the Secretary of the Navy, Washington, D.C.

[21] Appl. No.: 656,535

[22] Filed: May 31, 1996

[51] Int. Cl.[6] .............................. G02B 5/08; G02B 7/182; G02B 5/10; G02B 5/26

[52] U.S. Cl. ......................... 359/861; 359/862; 359/863; 359/884; 359/589; 359/584; 359/585; 359/614

[58] Field of Search .................................... 359/861, 862, 359/863, 884, 589, 585, 614, 584

[56] References Cited

U.S. PATENT DOCUMENTS

| | | | |
|---|---|---|---|
| 3,753,822 | 8/1973 | Heinrich | 156/101 |
| 4,054,125 | 10/1977 | Eckels | 126/270 |
| 4,291,988 | 9/1981 | Dixon, Jr. et al. | 356/437 |
| 4,805,989 | 2/1989 | Nakajima | 359/584 |
| 5,124,859 | 6/1992 | Martin et al. | 359/886 |
| 5,179,471 | 1/1993 | Caskey et al. | 359/603 |
| 5,182,670 | 1/1993 | Khan et al. | 359/359 |
| 5,440,143 | 8/1995 | Carangelo et al. | 250/573 |
| 5,574,286 | 11/1996 | Huston et al. | 250/372 |

OTHER PUBLICATIONS

N.H. Schiller et al., "Compact Picosecond Nd: Glass Mode–Locked Laser with Variable Cavity Length from 5 to 21m" Applied Optics, vol. 28, No. 5, 1 Mar. 1989, pp. 946–948.

J.U. White, "Long Optical Paths of Large Aperture", J.O.S.A., vol. 32, pp. 285–288, May 1942.

D.R. Herriot et al., "Folded Optical Delay Lines", Applied Optics, vol. 4, No. 8, pp. 883–889, Aug. 1965.

Literature from the Foxboro Company, entitled "Infrared Gas Analysis—The Wilks Variable Long Path Gas Cells", 8 pages, copyright © 1987.

*Primary Examiner*—Jon Henry
*Assistant Examiner*—Mohammad Y. Sikder
*Attorney, Agent, or Firm*—Thomas E. McDonnell; George Jameson

[57] ABSTRACT

An optical filter that uses multiple reflections to provide spectral bandpass filtering of ultraviolet, visible and infrared radiation with a very high transmission of wavelengths within a selected passband coupled with exceptional off-band rejection. The reflection filter uses dielectric-coated spherical reflectors or mirrors manufactured with absorbing glass substrates. The multiple-pass feature of the reflection filter is achieved using a traditional long-path absorption cell such as a White Cell or Wilkes Cell. The light transmitted through the reflection filter is only that light which has undergone multiple reflections as the wavelengths of high mirror reflectivity reflect off the dielectric-coated substrates. All remaining light at wavelengths corresponding to high mirror transmission is attenuated by absorption in the mirror substrate. The degree of attenuation of light at wavelengths corresponding to high mirror transmission can be chosen simply by selecting an appropriate number of reflections in the multiple-pass reflection filter.

14 Claims, 12 Drawing Sheets

FIG. 7
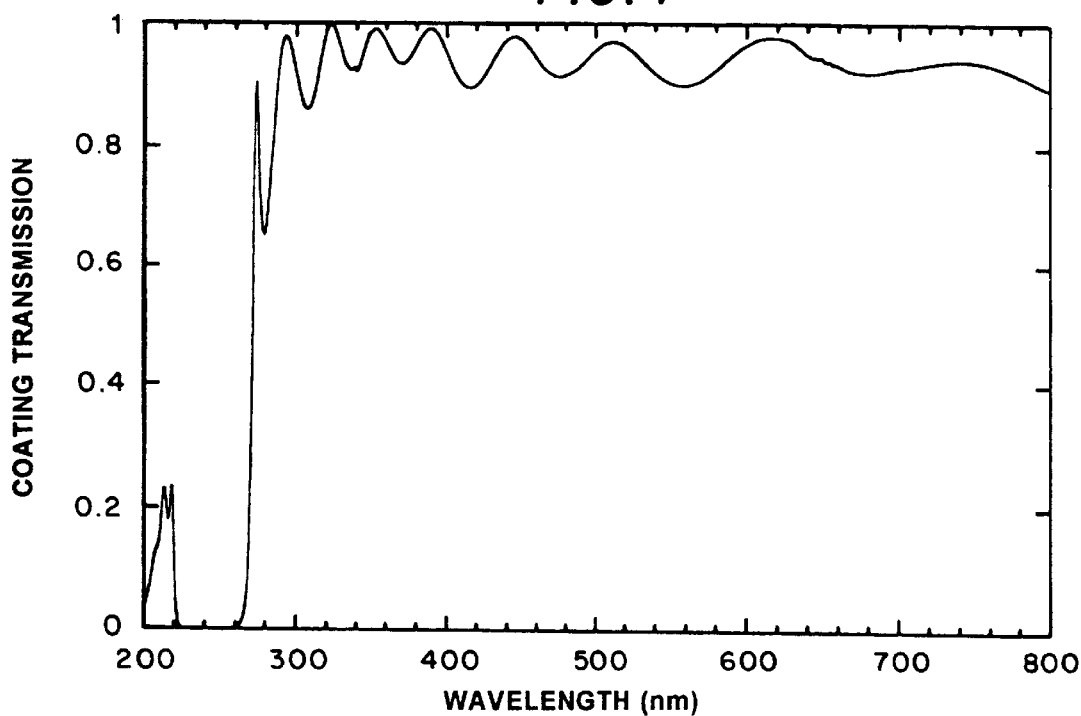
CALCULATED MULTI-PASS REFLECTION FILTER DEVICE TRANSMISSION USING COATING OF FIG. 7
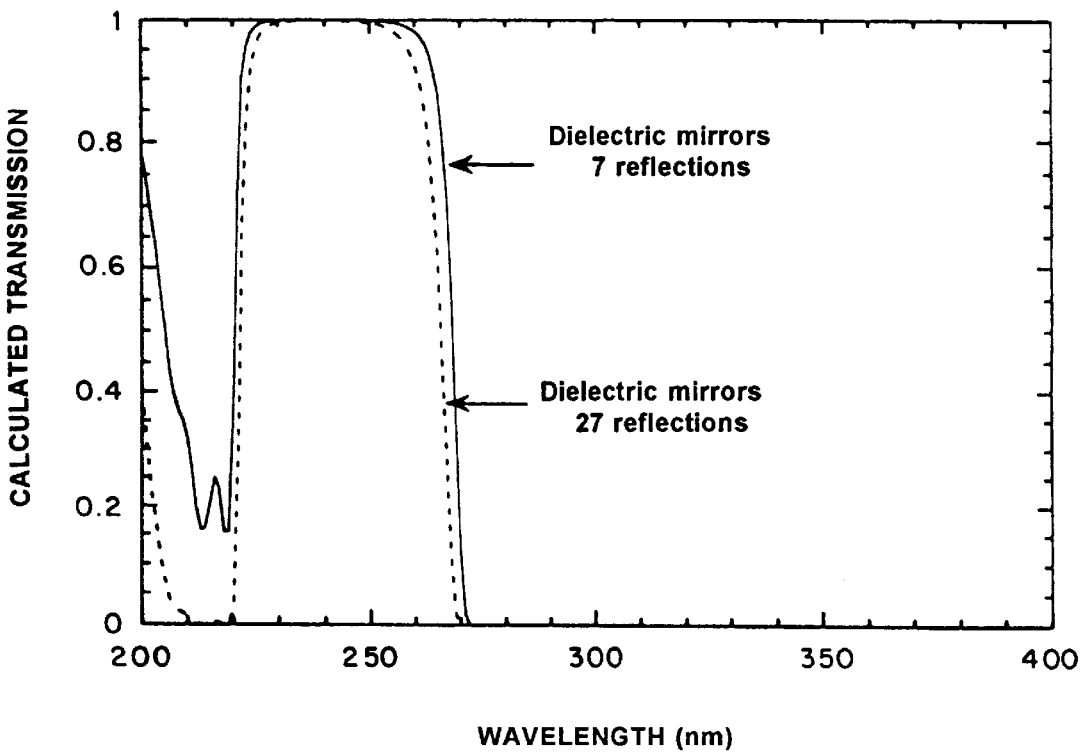
FIG. 8

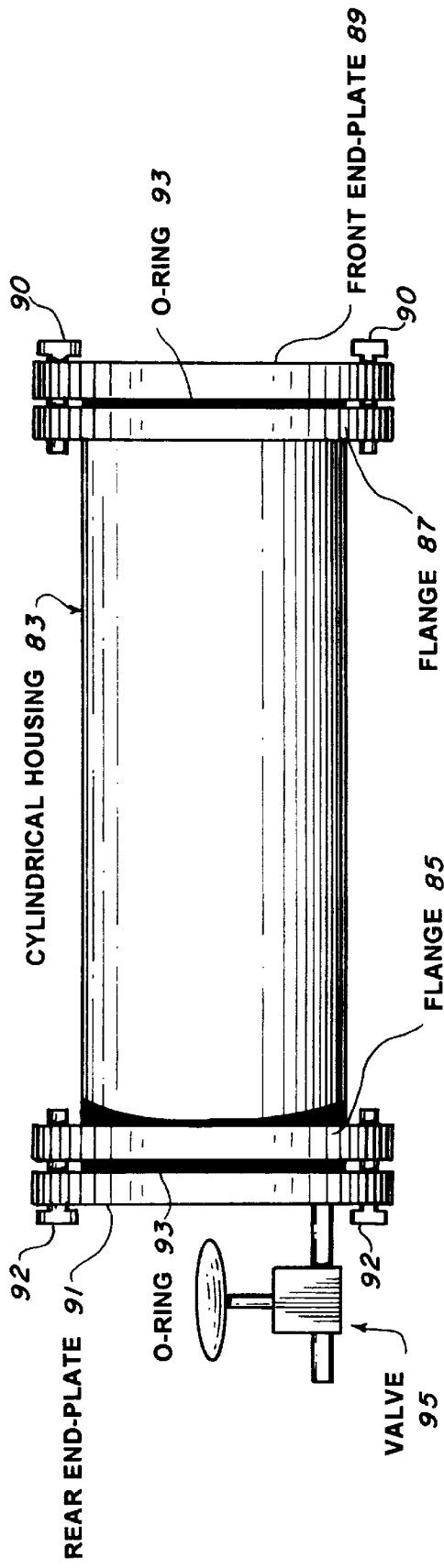
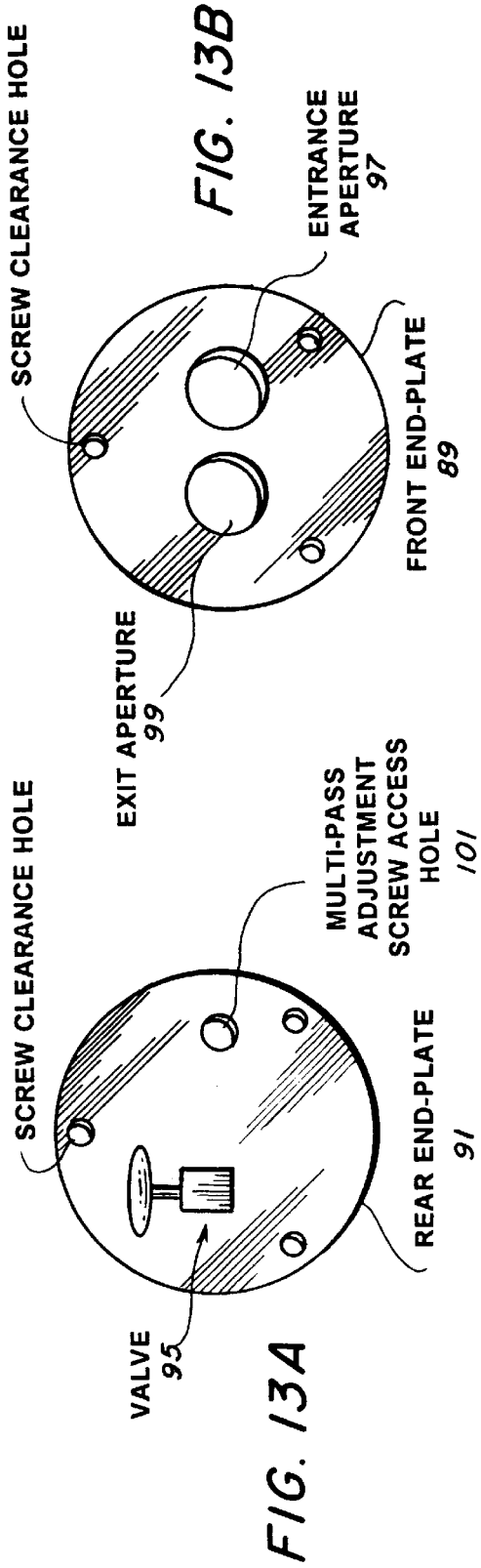
FIG. 12
FIG. 13A
FIG. 13B

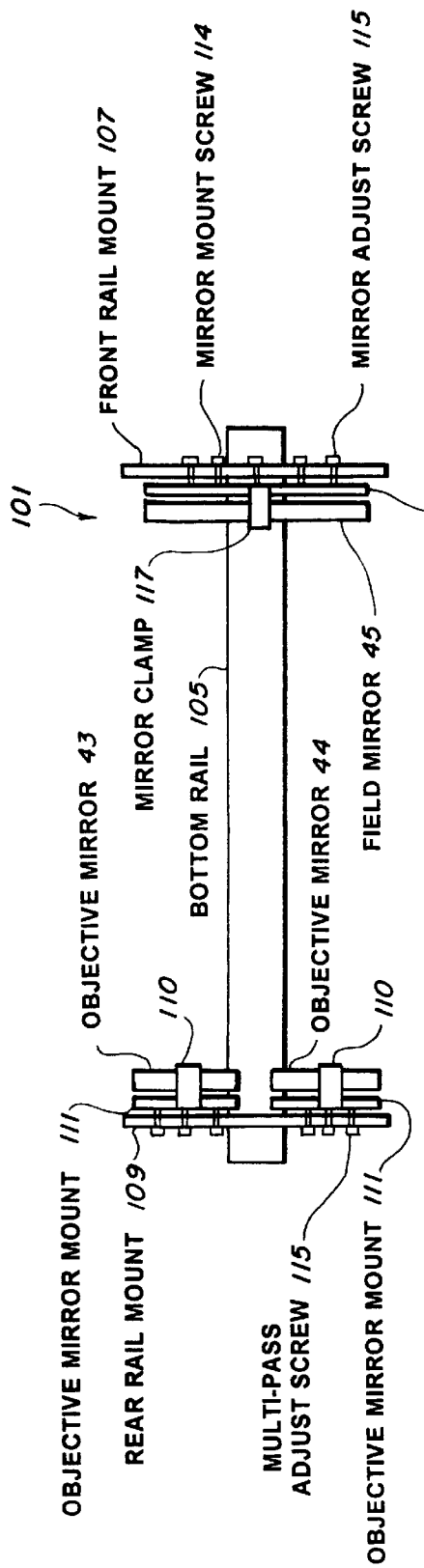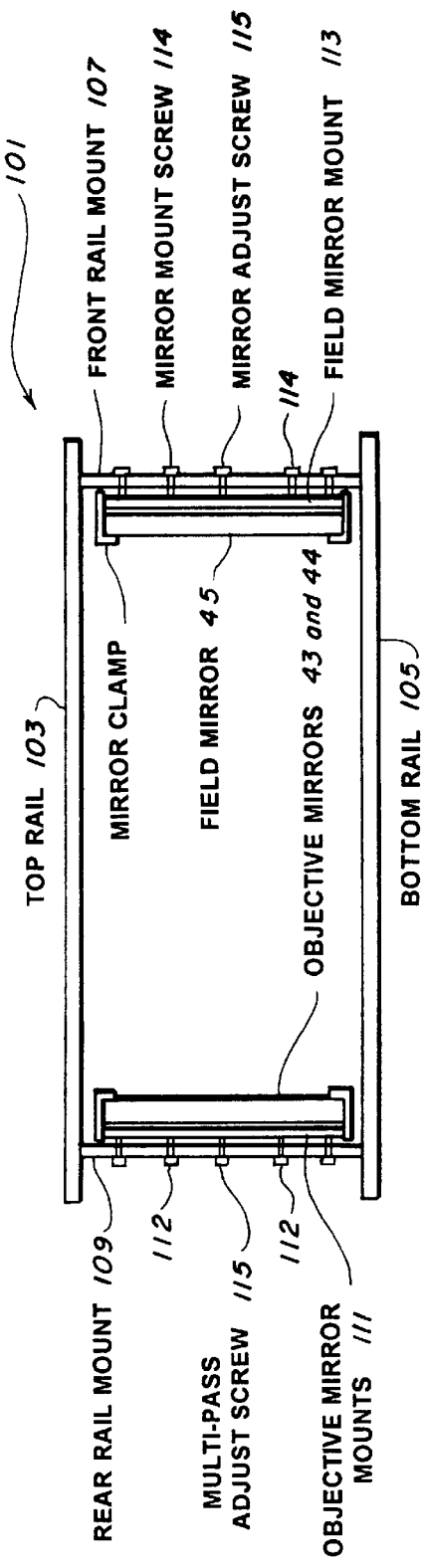
FIG. 14A TOP VIEW (top rail removed)
FIG. 14B SIDE VIEW

MULTIPLE-PASS REFLECTION FILTER

BACKGROUND OF THE INVENTION

1. Field of the Invention

The present invention relates to bandpass filters and particularly to a multiple-pass reflection filter which provides spectral bandpass filtering of ultraviolet, visible and infrared radiation with a very high transmission of wavelengths within a selected passband coupled with exceptional off-band rejection.

2. Description of Related Art

Bandpass filters are used to isolate wavelength intervals without the use of dispersive elements. Commercial bandpass filters fabricated of stacked dielectric layers are widely available for filtering applications from the vacuum UV to the far IR. The simplest bandpass filters are nothing more than small Fabry-Perot interferometers. Their light transmission characteristics depend on the nature of the interference of the light caused by multiple reflections within the dielectric stack. Most bandpass filters are made by combining the dielectric stack interference filter with additional blocking filters such as colored glass or metal films.

Filters are available as edge filters (short-wavelength pass or long-wavelength pass) or true bandpass filters (interval isolation with rejection of both longer and shorter wavelengths). These bandpass filters offer considerable flexibility in the specification of the center wavelength and the width of the passband. The performance of interference-type bandpass filters can be improved by fabricating the filter with several repeating units (cavities) of multi-layer dielectric stacks. Although the passband can be narrowed and the off-band rejection improved in this manner, the overall transmission off-band can not be reduced below a value of $T \sim 10^{-4}$ without seriously degrading the transmission at the center wavelength as well.

The transmission characteristics of interference-type bandpass filters are extremely angle dependent. In order to realize the anticipated transmission characteristics, the filter must be used in an optical system which ensures that only highly collimated light is incident on the filter. If uncollimated light is allowed to illuminate the filter, then light outside the expected passband may be transmitted. Simultaneously, the transmission of light at the passband may decrease dramatically. If the filter was constructed with metallic blocking layers, the passband can be split into two shifted passbands that transmit oppositely polarized light. Often only very small field angles (<5 degrees) are necessary to cause such deleterious effects.

Although interference and selective absorption are the most common techniques used for optical filters, other methods are also used. Polarization interference, scattering, and selective reflection are alternative techniques used for spectral filtering. In particular, reflection filters offer a simple method to obtain high maximum transmission of wavelengths within a selected passband coupled with a large off-band rejection. These filters are simply mirrors having reflectivity in the wavelength range of interest, but which absorb or transmit all other wavelengths. Reflection filters have been used to isolate wavelength intervals from the UV to the IR. Spectral filtering in the UV can be a particularly demanding application for which a reflection filter is well suited. For example, the transmission of a four-pass reflection filter manufactured by Schott Glasswork had a peak transmission of 0.91 at 250 nm and transmission of only 0.001 at 220 nm and 285 nm. The peak of the passband, as well as its width, is largely determined by the characteristics of the reflective coating.

SUMMARY OF THE INVENTION

It is therefore an object of the invention to provide an improved optical reflection filter.

Another object of the invention is to provide a multiple-pass reflection filter which provides spectral bandpass filtering of ultraviolet, visible and infrared radiation with a very high transmission of wavelengths within a selected passband coupled with exceptional off-band rejection.

Another object of the invention is to provide a multiple-pass reflection filter which uses an optical configuration that allows a high number of multiple reflections, yielding extremely efficient transmission in the pass-band and severe suppression of the off-band wavelengths.

A further object of the invention is to provide a multiple-pass reflection filter that utilizes a plurality of mirrors arranged in a desired configuration to provide spectral filtering, with each mirror comprised of a highly absorbing substrate, such as a highly absorbing black glass substrate, coated with a reflective dielectric coating to provide reflection at a selected bandpass and absorption of the off-band wavelengths.

These and other objects of this invention are achieved by providing a multiple-pass reflection filter which provides spectral bandpass filtering of ultraviolet, visible and infrared radiation with a very high transmission of wavelengths within a selected passband coupled with exceptional off-band rejection. The reflection filter uses dielectric-coated spherical reflectors or mirrors manufactured with absorbing glass substrates. The multiple-pass feature of the reflection filter is achieved using the optical configuration of a traditional long-path absorption cell such as a White Cell or Wilkes Cell. The light transmitted through the reflection filter is only that light which has undergone multiple reflections, at the wavelengths of high mirror reflectivity, off the dielectric-coated substrates. All remaining light at wavelengths corresponding to high mirror transmission is attenuated by absorption in the mirror substrate. The degree of attenuation of light at wavelengths corresponding to high mirror transmission can be chosen simply by adjusting the number of reflections in the multiple-pass reflection filter.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein:

FIG. 7 illustrates the measured transmission spectrum of dielectric coating type LWP-0-R240-265-T295-800, manufactured by CVI Laser Corporation;

FIG. 8 shows the calculated transmission of the multiple-pass reflection filter of the invention using opaque black glass substrates and the optical dielectric coating shown in FIG. 7, for a filter having 7 reflections (solid curve) and for a filter having 27 reflections (dashed curve);

FIG. 12 shows a schematic of the exterior of the Infrared Analysis, Inc., housing used in the construction of the prototype multi-pass reflection filter of the invention shown in FIG. 2;

FIGS. 13A and 13B respectively show the rear end-plate and front end-plate of the housing of FIG. 12;

FIGS. 14A and 14B respectively show schematics of top and side views of the Infrared Analysis, Inc. mirror rail assembly used in the construction of the prototype multipass reflection filter of the invention.

DETAILED DESCRIPTION OF A PREFERRED EMBODIMENT

The invention is directed to a multiple-pass reflection filter for providing an extremely high maximum transmission (T>0.8) at a desired passband while providing exceptional rejection (T<$10^{-20}$) off-band. With the choice of appropriate reflective dielectric coatings, spectral filtering with this invention throughout the ultraviolet, visible and infrared is possible.

Figure 1:
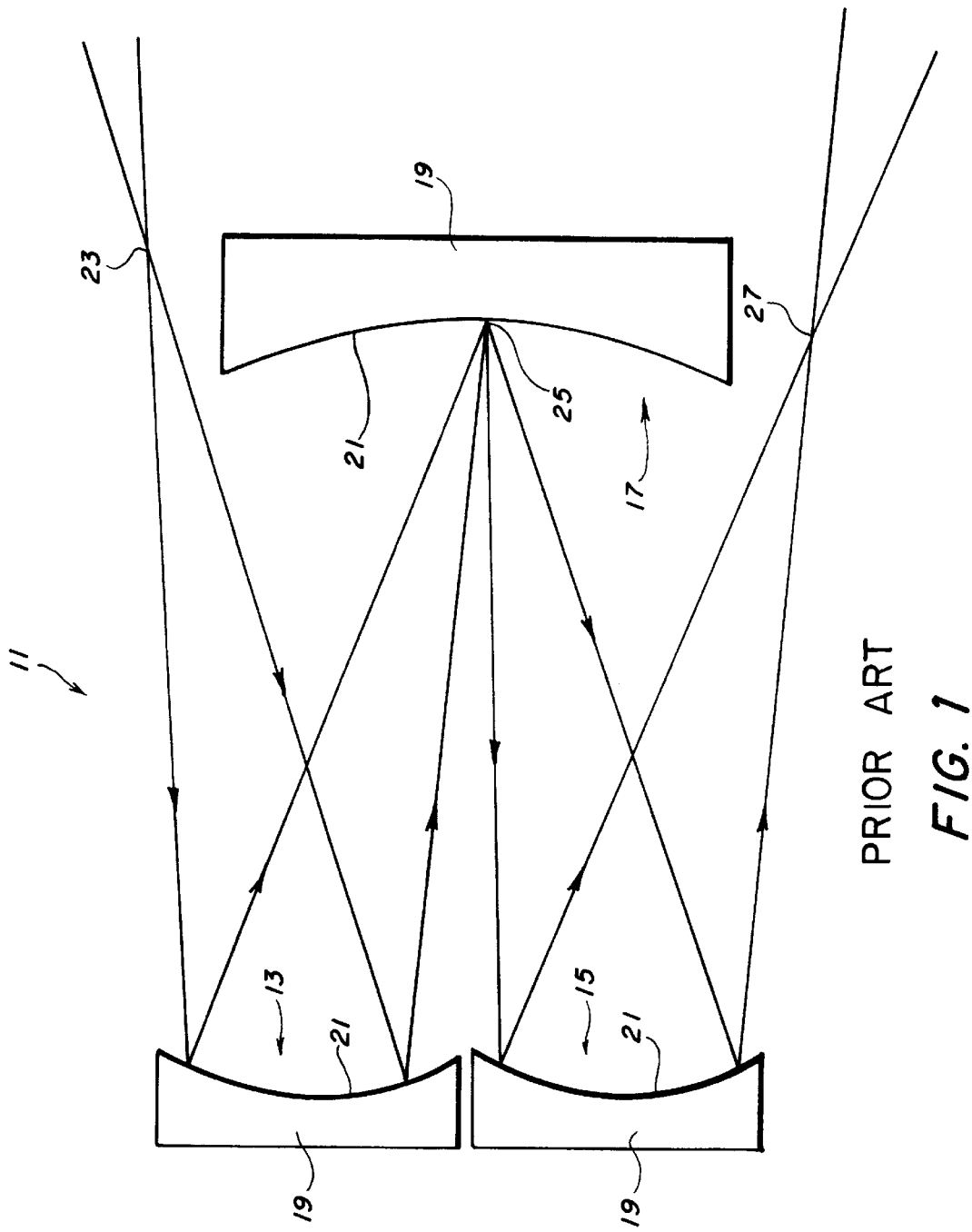
FIG. 1 is a schematic block diagram of a prior art gas cell having a White Cell optical configuration and showing four passes (three reflections) through the White Cell.

Referring now to FIG. 1, a schematic block diagram of a typical prior art White Cell 11 is shown. The White Cell 11 is a multipass reflector arrangement which was originally designed to address the problem of measuring infrared absorption spectra of gases having very low absorption coefficients. In order to collect absorption spectra with measurable signal-to-noise, extremely long path lengths were required.

The White Cell 11 is a solution to the problem of achieving a long path length in a small space. It is constructed of three spherical, concave mirrors 13, 15 and 17, each having the same radius of curvature. Mirrors 13 and 15, called the objective mirrors, are placed side by side at one end of the cell 11. The remaining mirror 17, called the field mirror, is placed at the other end of the cell 11. The length of the cell 11 is the radius of curvature, with the center of curvature of the field mirror 17 at a point directly between the objective mirrors 13 and 15, while the centers of curvature of the objective mirrors 13 and 15 are on the front surface of the field mirror 17.

Typically, each of the concave mirrors 13, 15 and 17 of the basic gas absorption White Cell 11 of FIG. 1 is a broadband mirror comprised of a clear glass substrate 19 having a reflective metal coating 21, made of gold, silver or aluminum, disposed on the concave side of the concave mirror.

In operation, light from a laser (not shown), a light bulb (not shown) or any other suitable light source (not shown) is focused by a lens (not shown) through an entrance aperture (not shown) in the cell 11 to a focal point 23 close to one end of the field mirror 17. This light passing through the focal point 23 diverges or expands to fill the objective mirror 13, then is focused by the objective mirror 13 to a focal point 25 on the field mirror 17. Light at the focal point 25 reflects off the field mirror 17, diverges or expands to fill the objective mirror 15, then is focused by the objective mirror 15 through a focal point 27 and out an exit aperture (not shown) in the cell 11 on the opposite side of the field mirror 17. Essentially, this operation is a matter of refocusing the light, re-expanding the light, refocusing the light, re-expanding the light and so forth between the objective and field mirrors 13, 15 and 17, until the light finally passes through the focal point 27 and out of the exit aperture in the cell 11.

Slight adjustments of adjustment screws (FIGS. 14A and 14B) on the objective mirrors 13 and 15 allow the path length or, equivalently, the number of reflections to be easily adjusted in increments of four path lengths (or reflections). The cell 11 of FIG. 1 is drawn showing four cell traversals or passes and three reflections. White Cells with one hundred or more passes are easily constructed. Regardless of the number of passes involved, light enters through the entrance aperture close to one end of the field mirror 17 and reflects alternately between the objective and field mirrors 13, 15 and 17 until it is directed out of the exit aperture on the opposite side of the field mirror 17.

The basic long path gas absorption cell 11 of the White optical configuration discussed in relation to FIG. 1 has several operational defects which make it unsuitable for operation as applicants' multiple-pass reflection filter. More specifically, it uses broadband mirrors which prevent spectral filtering; its clear glass substrates are not the broadband absorbers of light that are required in a multi-pass reflection filter; spurious reflections are produced inside the cell 11; and dust and other particulates within the cell 11 cause light in the cell 11 to be scattered.

Therefore, in order to be used in the invention of this application, the basic long path gas absorption cell 11 of the White optical configuration of FIG. 1 must be modified in the following significant respects.

1) Mirrors

In order to achieve spectral filtering in the multiple-pass reflection filter of this invention, broadband mirrors cannot be used. Dielectric-coated mirrors that permit spectral discrimination must be used. As stated before; the mirrors of commercially available gas absorption cells are typically broadband metal-coated reflectors (gold, silver, and aluminum are commonly used). On the other hand, the dielectric coatings required for the multiple-pass reflection filter of the present invention must have at least one wavelength range of high reflectivity, as well as one or more wavelength regions of high transmission outside the region of high reflectivity. Such dielectric coatings are of the same type that is designed for bandpass filtering of UV, visible, and IR light or radiation which provide a very high transmission of wavelengths within a selected passband coupled with exceptional off-band rejection, and are widely used in the optics industry to manufacture high reflectivity laser mirrors, long-wavelength pass filters and short-wavelength pass filters.

2) Mirror Substrate Material

The mirror substrate material must be highly absorbing. Standard metal-coated as well as dielectric-coated mirrors generally use clear glass substrates. Typical substrate materials include pyrex, fused silica, and BK7 glass, to name a few. These glasses are not broadband absorbers of light. In order to achieve the light absorption required by the multiple-pass reflection filter a highly opaque, black glass mirror substrate is preferred as an effective technique to absorb the transmitted light. An alternative mirror substrate that can be used, but is not as effective as the black glass substrate, utilizes a standard clear glass with all non-reflecting surfaces coated with an opaque substance, such as black wax or black tape.

3) Spurious Reflections

All spurious reflections inside the reflection filter must be eliminated. Every surface other than the mirrors must absorb any light incident upon it. This can be accomplished using special optically black paints or surface treatments such as black anodization.

4) Scattered Light

In order to further eliminate scattered light, the interior of the cell may be evacuated to remove all dust and other particulates.

Figure 2:
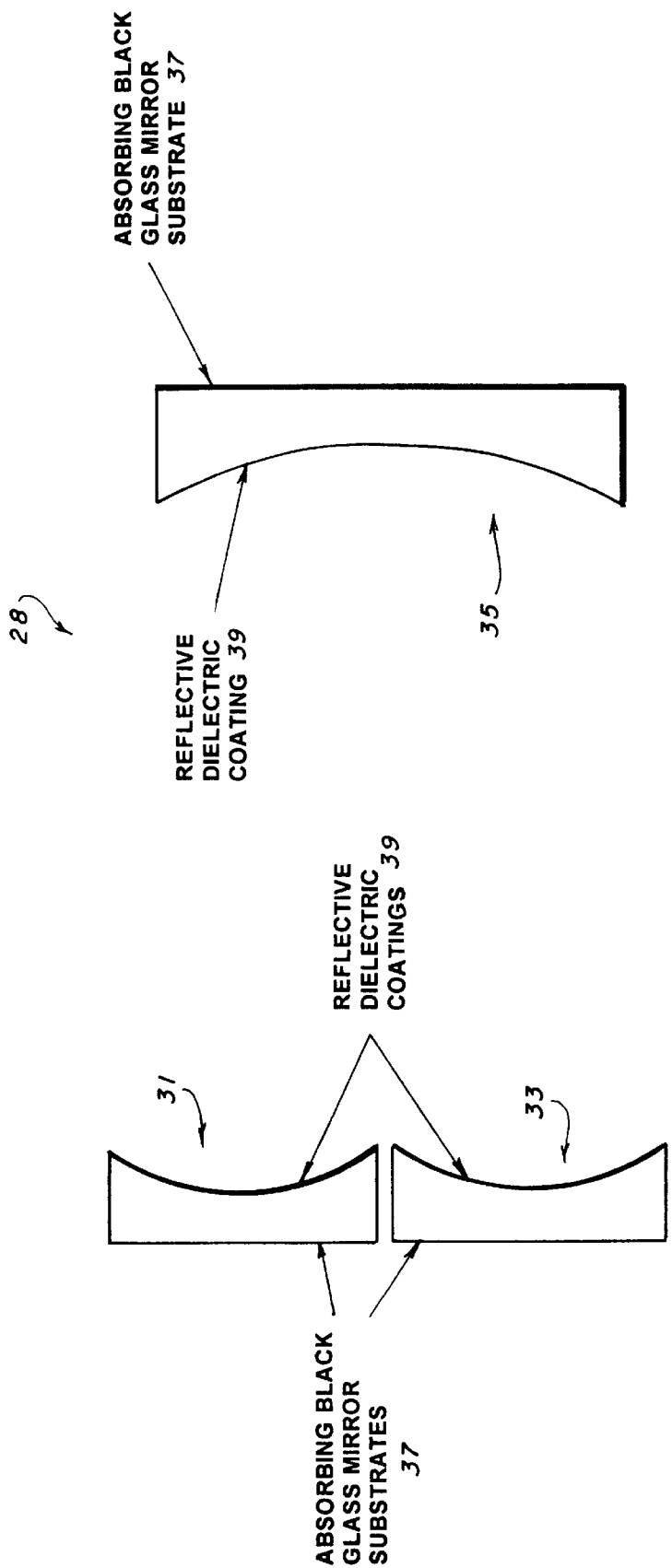
FIG. 2 is a schematic block diagram of the optics of the multiple-pass reflection filter of the invention, arranged in a White Cell optical configuration.

Referring now to FIG. 2, a schematic diagram of a multiple-pass reflection filter 28 constructed in accordance with the invention and using the White Cell optical configuration is shown. Three spherical mirrors 31, 33 and 35 fabricated using opaque absorbing black glass substrates or mirror substrates 37 and coated with reflective dielectric coatings 39 are used in the reflection filter 28. The placement of the spherical mirrors 31, 33 and 35 in the reflection filter 28 and the light paths through the reflection filter 28 are similar to the corresponding mirrors 13, 15 and 17 and light paths that has been described above in relation to the White Cell 11 in FIG. 1 and, hence, require no further description.

Slight adjustments of adjust or adjustment screws (FIGS. 14A and 14B) on the objective mirrors 31 and 33 of FIG. 2 allow the path length or, equivalently, the number of reflections to be easily adjusted in increments of four path lengths (or reflections). As stated before, White Cells with one hundred or more passes are easily constructed. Regardless of the number of passes involved in the multiple-pass reflection filter 28 of FIG. 2, light from a light source (not shown) is focused by a lens (not shown) through an entrance aperture (FIG. 13B) close to one end of the field mirror 35 and reflects alternately between the objective and field mirrors 31, 33 and 35 until it is directed out of an exit aperture (FIG. 13B) on the opposite side of the field mirror 35.

The multiple-pass reflection filter 28 of the White Cell configuration shown in FIG. 2 could be implemented in the following three exemplary ways.

In a first example, a long-wavelength pass, multiple-pass reflection filter 28 of the White Cell configuration of FIG. 2 could be implemented using standard off-the-shelf dielectric coatings, manufactured by many optical coating companies. Note that a coating used for a transmission type short-wavelength pass filter will yield a long-wavelength pass filter if used in a reflection configuration.

Figure 3B:
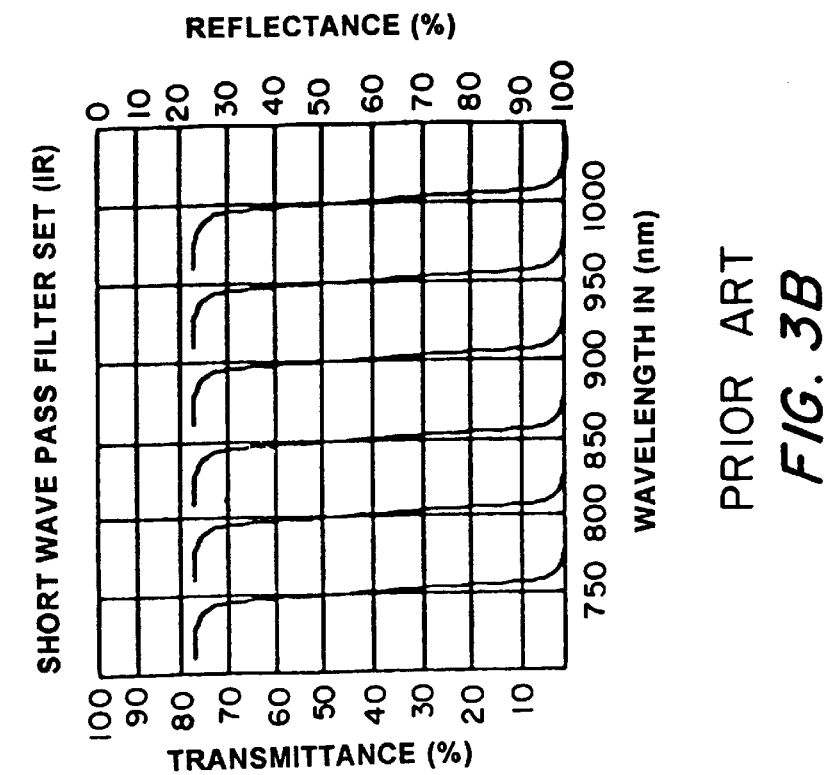
FIGS. 3A and 3B respectively illustrate two modified sets of prior art, families of curves showing the transmission spectra of short-wavelength passing, dielectric-coated, bandedge filters manufactured by the CVI Laser Corp.
Figure 3A:
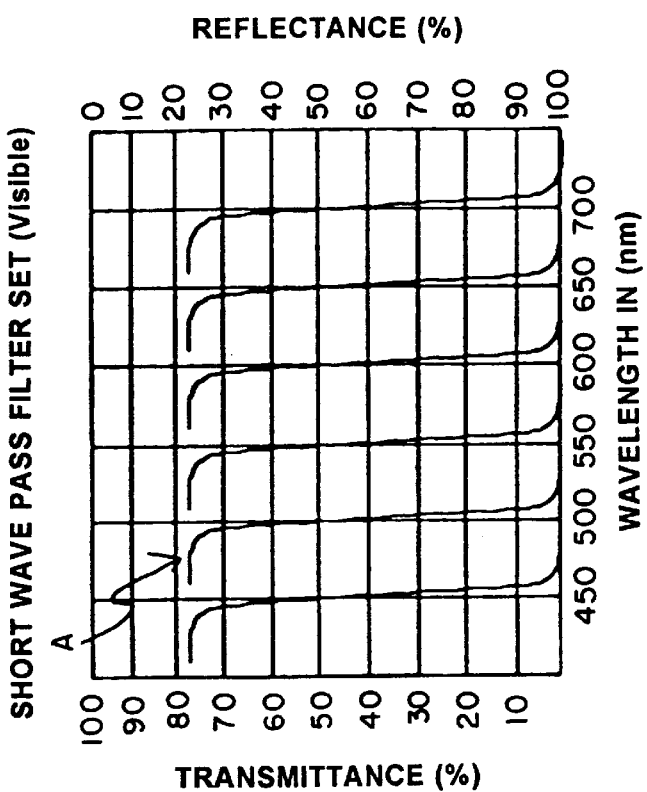

For example, FIG. 3A shows the transmission spectra of a series of electron beam-deposited, short-wavelength pass coatings manufactured by the CVI Laser Corporation of Albuquerque, N. Mex., having bandedges at 450 nm, 500 nm, 550 nm, 600 nm, 650 nm and 700 nm in the visible light band; while FIG. 3B shows the transmission spectra of a series of electron beam-deposited, short-wavelength pass coatings manufactured by the CVI Laser Corporation, having bandedges at 750 nm, 800 nm, 850 nm, 900 nm, 950 nm and 1000 nm in the IR light band. (These coatings are presented simply as an example to indicate the characteristics of commercially available coatings. Other manufacturers can also fabricate satisfactory coatings using completely different methods.)

For the short-wavelength pass coatings of FIGS. 3A and 3B, the peak reflectance for wavelengths longer than the bandedge is >0.995, while the reflectance for wavelengths shorter than the bandedge is 0.22. If one of these coatings were to be incorporated into a 32 pass reflection filter (31 reflections) a long pass filter would result having a transmission of 0.85 for wavelengths longer than the bandedge, while the transmission for wavelengths shorter than the bandedge would be less than $10^{-20}$.

Figure 4:
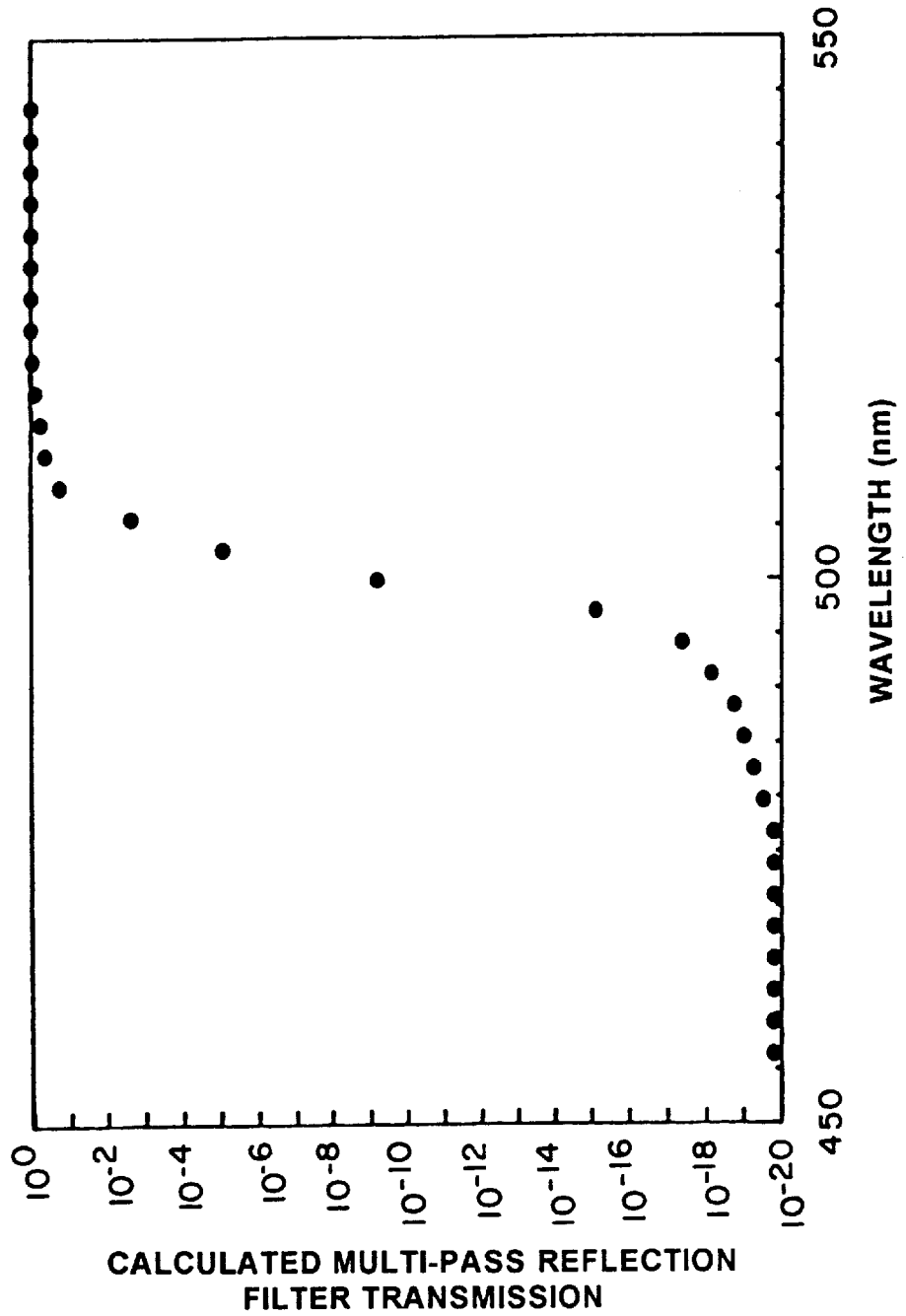
FIG. 4 shows the calculated transmission of a 32-pass reflection filter of the invention shown in FIG. 2, constructed using the dielectric-coated mirrors of FIG. 2 and having the transmission characteristics of curve A in FIG. 3A (where the bandedge is shown at 500 nm)

FIG. 4 shows the calculated transmission of such a filter having a bandedge at 500 nm (curve A in FIG. 3A). In order for the multiple-pass reflection filter 28 (FIG. 2) of this invention to be effective, this off-band light must be blocked. Since the reflective dielectric coatings in FIGS. 3A and 3B are transparent to short wavelength light, then all this light will be transmitted through the reflective dielectric coatings 39 (FIG. 2) to the mirror substrate 37 (FIG. 2). In order to block the light, the mirror substrate 37 must be highly absorbing. An absorbing mirror substrate 37 could be fabricated using black glass. Schott Glass Technology manufactures a suitable black glass (Type S-8900) that has exceptionally high broadband absorption characteristics and good physical properties so that the glass can be ground and polished into spherical mirror substrates. The index of refraction of the glass is suitable for use in conjunction with the dielectric coating materials used by coating manufacturers.

In a second example, a short-wavelength pass multiple pass reflection filter 28 of the White cell configuration of FIG. 2 could be implemented using standard off-the-shelf dielectric coatings used for manufacturing long-wavelength pass transmission filters. Note that a coating used for a transmission type long-wavelength pass filter will yield a short-wavelength pass filter if used in a reflection configuration.

Figure 5B:
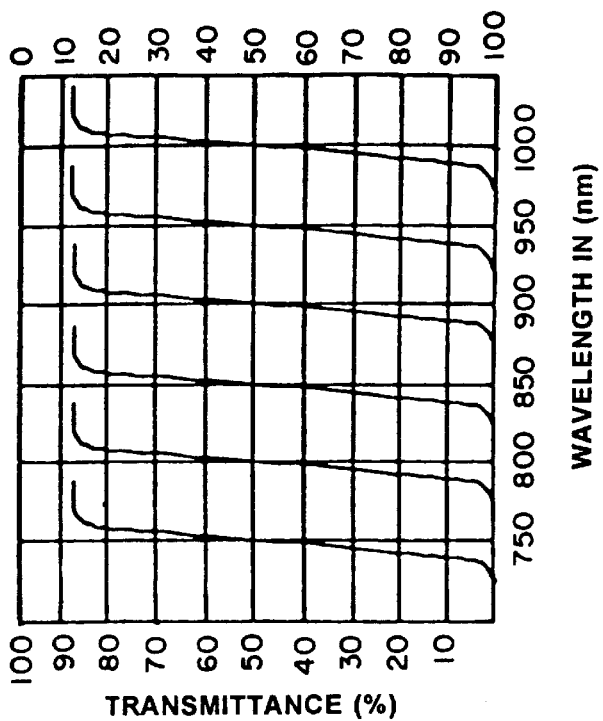
FIGS. 5A and 5B respectively illustrate two modified sets of prior art, families of curves showing the transmission spectra of long-wavelength passing, dielectric-coated, band-edge filters manufactured,,by the CVI Laser Corp.
Figure 5A:
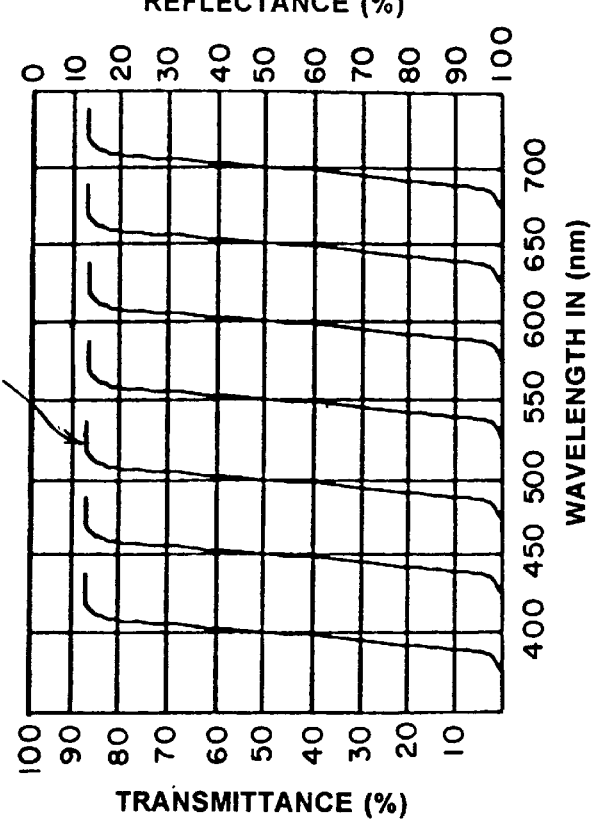

For example, FIG. 5A shows the transmission spectra of a series of long-wavelength pass coatings manufactured by the CVI Laser Corporation of Albuquerque, N. Mex., having bandedges at 400 nm, 450 nm, 500 nm, 550 nm, 600 nm, 650 nm and 700 nm; while FIG. 5B shows the transmission spectra of a series of long-wavelength pass coatings manufactured by the CVI Laser Corporation, having bandedges at 750 nm, 800 nm, 850 nm, 900 nm, 950 nm, and 1000 nm.

For the long-wavelength pass coatings of FIGS. 5A and 5B, the peak reflectance for wavelengths shorter than the bandedge is >0.995, while the reflectance for wavelengths shorter than the bandedge is 0.12. If one of these coatings having the bandedge at 500 nm or shorter wavelength, were to be incorporated into a 32 pass White cell (31 reflections) a short-pass filter would result having a transmission of 0.85 for wavelengths shorter than the bandedge, while the transmission for wavelengths longer than the bandedge would be less than $10^{-28}$.

Figure 6:
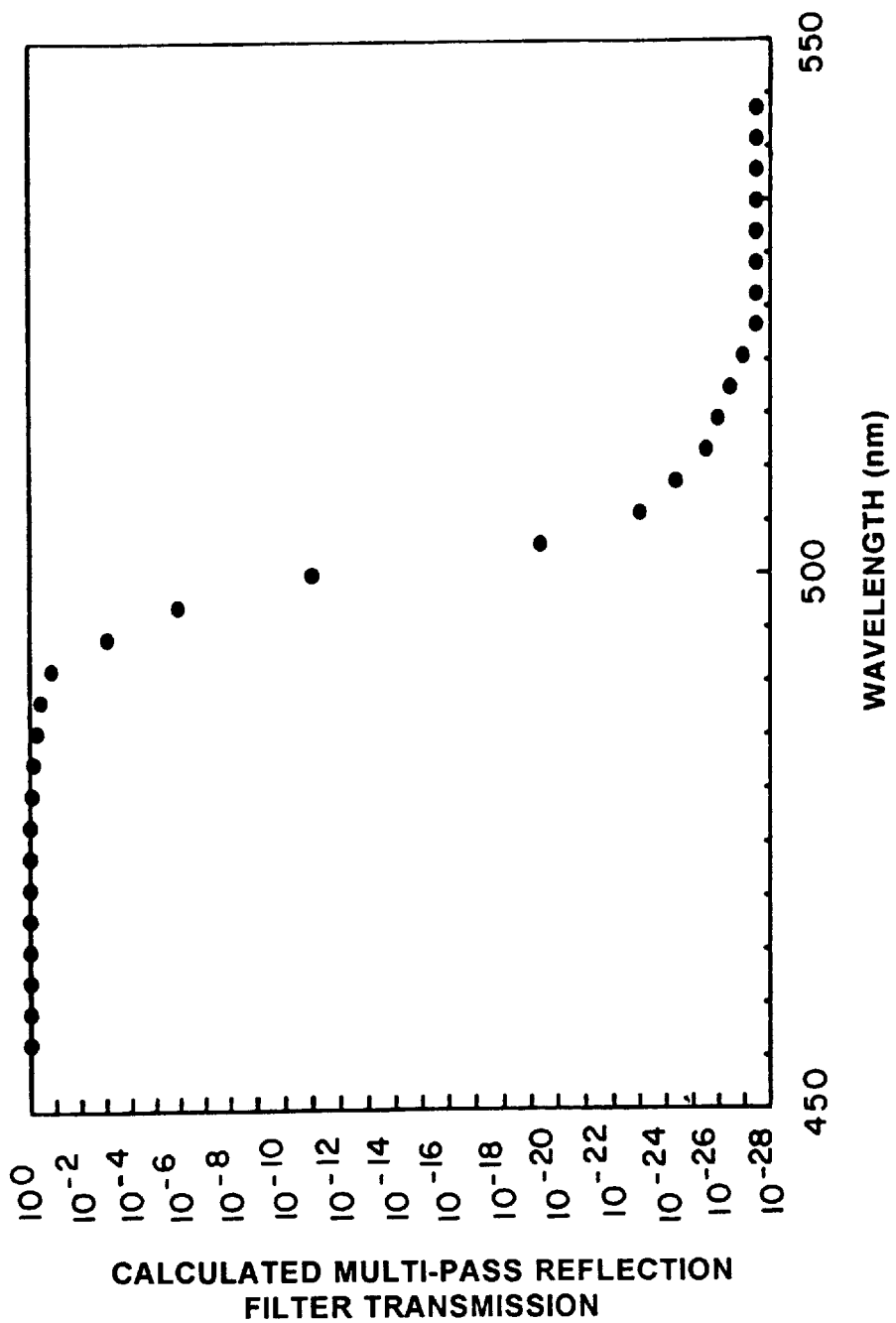
FIG. 6 shows the calculated transmission of a 32-pass reflection filter of the invention shown in FIG. 2, constructed using the dielectric-coated mirrors of FIG. 2 and having the transmission characteristics of curve B in FIG. 5A (where the bandedge is shown at 500 nm)

FIG. 6 shows the calculated transmission for a filter having the bandedge at 500 nm (curve B in FIG. 5A). The short-wavelength pass characteristics of a filter constructed using the coatings with a bandedge at wavelengths longer than 500 nm would have a short-passband extending to wavelengths about 150 nm below the bandedge. This occurs because the long wavelength pass filters of FIGS. 5A and 5B, having bandedges at wavelengths longer than 500 nm, are constructed with colored glass filters to aid in blocking the short wavelength light.

In a third example, a multiple-pass reflection filter 28 of the White Cell configuration of FIG. 2 would utilize reflective dielectric coatings 39 with a narrow stopband of reflectance and would therefore transmit only a narrow pass band of light. High reflectance, dielectric-coated mirrors are commonly manufactured and used for laser mirrors. The mirrors can typically have peak reflectance at the center wavelength and the width of the band can be as narrow as 10 nm. The width of the band is generally not an important parameter for laser mirror applications and the standard laser mirrors often have bands with widths of 50±25 nm. However, reflectance bandwidths of 10 nm can be easily manufactured, if required. Considering again the coatings manufactured by CVI Laser Corp., the peak reflectance at the center wavelength is >0.998 while off-band it is <0.15. Use of such a coating in a 32-pass reflection filter will yield a transmission T~0.94 at the passband, and T<10−25 off-band.

CONSTRUCTION, CHARACTERISTICS AND TEST OF INVENTION

A specific White Cell configuration, multiple-pass, short-wavelength reflection filter of this invention was constructed for the case of a solar blind filter with the bandedge (50% transmission wavelength) at 280 nm. Three concave spherical mirrors 43, 44 and 45 (FIG. 9) having a radius of curvature of 6 inches were used in a 32 pass White Cell 47 configuration. A long path gas absorption cell 49 having the White Cell optical configuration was purchased and modified. An exemplary gas absorption cell is model M-3-6-V-BA-AL+MGF2-SD, manufactured by Infrared Associates, Inc., Anaheim, Calif. The metal coated mirrors of the long-pass absorption cell were replaced with dielectric-coated black glass mirror substrates. The spherical mirror substrates can be manufactured (cut, ground and polished) by any number of commercial optical fabricators from a black glass, of which type S-8900 from Schott Glass Technology is an exemplary black glass. The reflective mirror surfaces were dielectric coatings, deposited by an optical coating company. An exemplary optical dielectric coating for use in a solar blind multiple-pass reflection filter is type LWP-0-R240-265-T295-800, manufactured by CVI Laser Corporation.

The transmission spectrum of the dielectric coating type LWP-0-R240-265-T295-800 was measured and is shown in FIG. 7. This spectrum was obtained from a fused silica witness plate that was coated at the same time as the black glass substrates. This dielectric coating has high reflectivity from about 220 nm to about 260 nm and, when used in the multiple-pass reflection filter of the invention, yields a highly effective solar blind filter.

FIG. 8 shows the calculated transmission of the multiple-pass reflection filter of the invention using opaque black glass substrates and the optical dielectric coating shown in FIG. 7. The transmission was calculated for a filter having 7 reflections (solid curve) and for a filter having 27 reflections (dashed curve).

Figure 9:
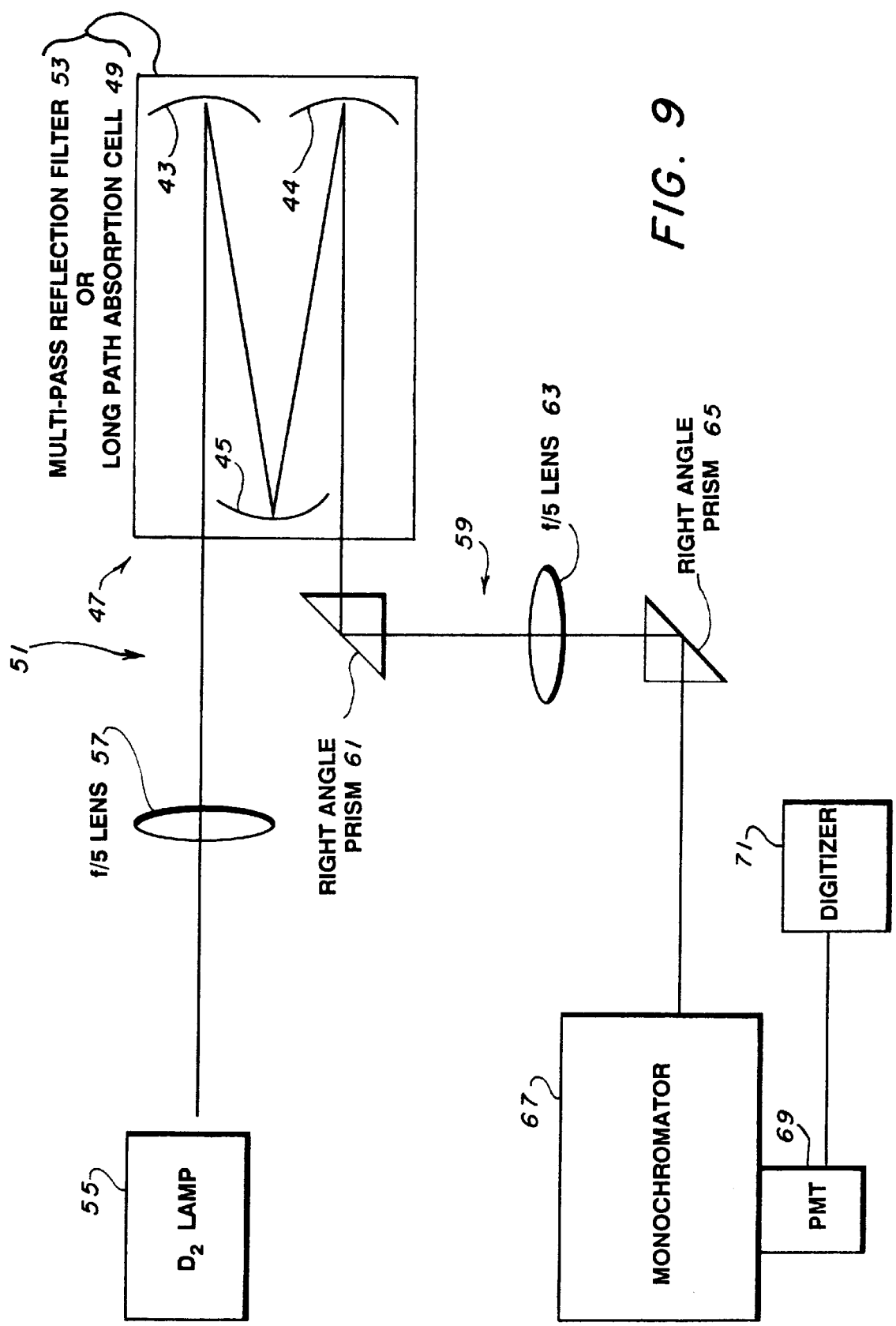
FIG. 9 is a schematic block diagram of an experimental apparatus used to characterize the performance of the multiple-pass reflection filter of the invention.

Referring now to FIG. 9, FIG. 9 is a schematic block diagram of the constructed experimental apparatus 51 that was used to characterize the performance of the multiple-pass reflection filter 28 (FIG. 2) of the invention. The apparatus 51 was operated using both the aluminum-coated mirrors of the long path gas absorption cell 49 and the subsequent dielectric-coated mirrors of a multiple-pass reflection filter 53 for the mirrors 43, 44 and 45.

The multiple-pass White Cell mirror assembly 47 was tested using a deuterium ($D_2$) lamp 55 as the source of ultraviolet (UV) and visible light. The light from the lamp 55 was focused into the long path absorption cell 49 or the multi-pass reflection filter 53 using an f/5 fused silica lens 57.

The White Cell mirror assembly 47 of the apparatus 51 was used in the open air, without the anodized aluminum enclosure and without any additional colored filter glasses. The light exiting the White Cell mirror assembly 47 was directed by an exemplary optical assembly 59, comprised of a right angle prism 61, an f/5 lens 63 and another right angle prism 65, into a scanning monochromator 67 which scans through all of the wavelengths from the UV to the visible and keeps a record of the transmission characteristics of the multi-pass reflection filter. The output light from the monochromator 67 is then detected by a photomultiplier tube 69 to produce analog signals. A digitizer 71 converts the analog signals from the photomultiplier tube 69 to digital information and displays the transmission characteristics of the multipass reflection filter device being used.

Figure 10:
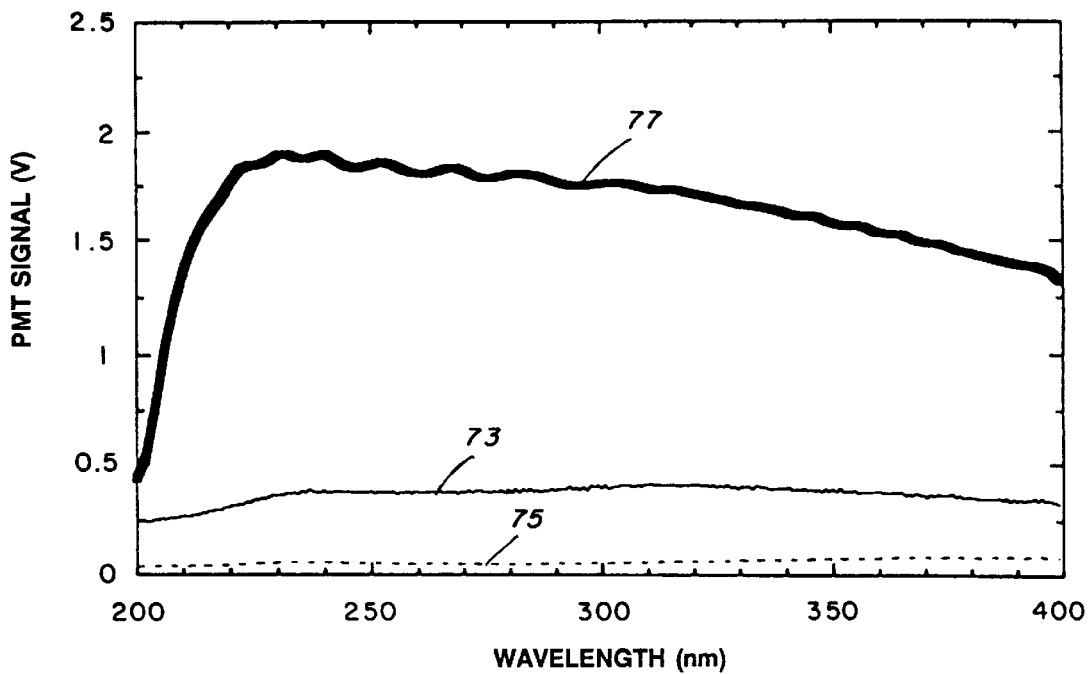
FIG. 10 illustrates the measured transmission spectrum, between 200 and 400 nm, of the long path absorption White Cell, model M-3-6-V-BA-AL+MGF2-SD, using aluminum-coated mirrors for the cell set for 7 reflections (solid curve) and 27 reflections (dashed curve), compared to the spectrum of the incident deuterium lamp light (bold curve)

FIG. 10 shows the transmission of light through the prior art, long-path absorption White Cell mirror assembly 49 (FIG. 9) between 200 nm and 400 nm for the filter 49 (FIG. 9) with the aluminum-coated mirrors 43, 44 and 45 installed. In this case the mirror substrates are clear glass, not black glass. The curve 73 shows the transmission for 8-pass settings of the objective mirrors 43 and 44 (FIG. 9), while curve 75 shows the transmission for 28-pass settings of the objective mirrors 43 and 44. The heavy top curve 77 is the output of the deuterium lamp 55 (FIG. 9) which is measured directly with the monochromator 67 to establish a reference. The curve 77 is shown for purposes of reference. Since aluminum is a poor reflector in the ultraviolet, the transmission of the long path absorption cell 49 is not good for both the 8-pass (or 7-reflection) case and the 28-pass (or 27-reflection) case. There is not much light getting through the long-path absorption White Cell mirror assembly 49 (FIG. 9). Since aluminum is not a good light reflector, the more reflections in the long path absorption cell 49 (FIG. 9), the lower the transmission, because there are more light losses. So after 27 reflections, there is hardly any light at all getting through. Thus, FIG. 10 clearly shows the the long path absorbing White Cell 49 (FIG. 9) provides poor broadband transmission of light through the Cell 49.

Figure 11:
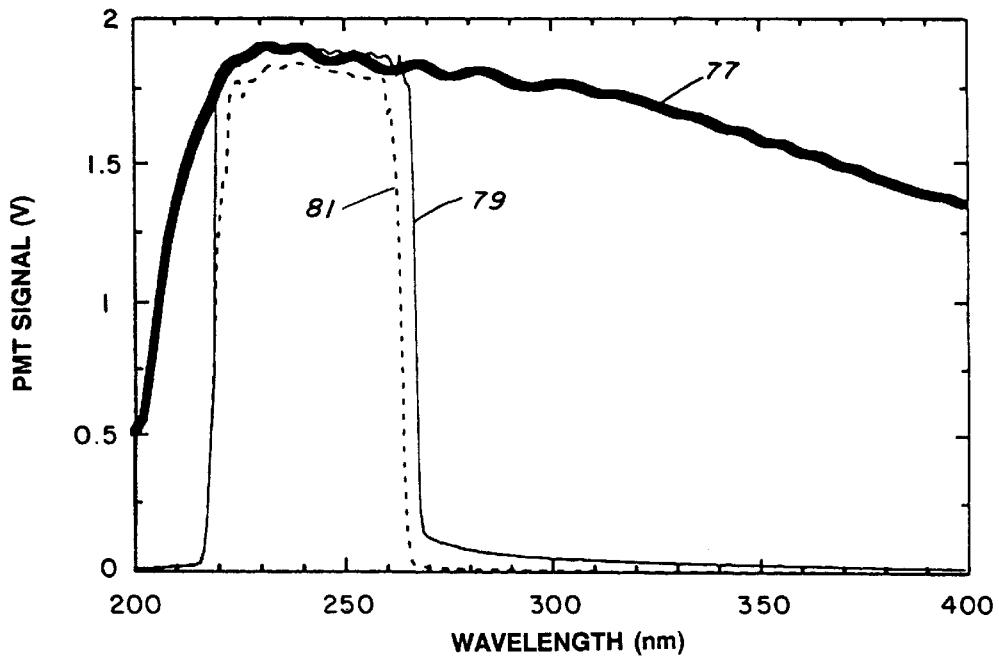
FIG. 11 illustrates the measured transmission spectrum, between 200 and 400 nm, of the multiple-pass reflection filter of the invention, using the mirrors manufactured with the dielectric coating described in relation to FIG. 7 on opaque black glass substrates, for the filter set for 7 reflections (solid curve) and 27 reflections (dashed curve) compared to the spectrum of the incident deuterium lamp light (bold curve)

FIG. 11 shows the transmission of light through the multi-pass reflection filter 53 (FIG. 9) of the invention between 200 nm and 400 for the filter 53 with the dielectric-coated mirrors installed. Again, the curve 77 for the deuterium lamp signal is shown for reference. The curve 79 shows the transmission for 8-pass settings of the objective mirrors 43 and 44 (FIG. 9), while curve 81 shows the transmission for 28-pass settings of the objective mirrors 43 and 44 (FIG. 9). It is clear that, for both the 8-pass and 28-pass mirror settings, the throughput of the multi-pass reflection filter 53 is essentially 100% in the bandpass region. The offband rejection is exceptional, particularly for the 28-pass arrangement. Thus, FIG. 11 clearly shows the transmission characteristics of the dielectric-coated black glass mirrors 43, 44 and 45 of the multi-pass reflection filter 53 (FIG. 9) of the invention are very high, and that the these dielectric-coated black glass mirrors have the transmission characteristics given by FIG. 7.

FIGS. 12, 13A, 13B, 14A and 14B are schematic diagrams of the specific White Cell housing and mirror mounts, manufactured by Infrared Analysis, Inc., that are used in the construction of the prototype multi-pass reflection filter of this invention.

FIG. 12 shows a side view of the outside of the housing of the cell, while FIGS. 13A and 13B show opposite end views of end-plates of the housing. These Figures show an exemplary aluminum cylindrical housing 83 that is about 3" in diameter and about 8" long and has flanges 85 and 87 on opposite ends of the housing 83 so that a front end-plate 89 can be attached to the flange 87 by screws 90 and a rear end-plate 91 can be attached to the flange 85 by screws 92. In-between each of the end plates 89 and 91 and their respective associated flanges 87 and 85 is an o-ring 93 to provide an air-tight seal so that the housing 83 can be evacuated.

Every surface (not shown) inside of the aluminum housing 83 is either black anodized or coated with an optically black coating, such as a black paint or some other special optical black paint.

Attached on the rear end-plate 91 is a vacuum valve 95 which is used to pump air out of the housing 83 by opening the valve 95, evacuating the housing 83 with a vacuum pump (not shown) attached to the valve 95, and then closing the valve 95 after the housing 83 is evacuated so a vacuum or partial vacuum could be maintained inside the housing 83. A vacuum or partial vacuum is required to eliminate any dust particles that might be floating about in the air inside the housing 83 so that such dust particles will not cause any scattering of the light which could negatively affect the performance of the multiple-pass reflection filter inside of the housing 83.

A mirror rail assembly (shown in FIGS. 14A and 14B) is held in place by the end-plates 89 and 91 that are respectively attached to the flanges 87 and 85 on the housing 83. The front end-plate 89 has an entrance aperture 97 that permits the unfiltered light to enter the multi-pass reflection filter 53 (FIG. 9) and an exit aperture 99 that permits the filtered light to exit the multi-pass reflection filter 53 (FIG. 9). A multi-pass adjustment screw access hole 101 is drilled in the rear end-plate 91 to permit adjustment of the number of passes that the light will traverse in the filter 53 (FIG. 9). If the housing 83 were to be evacuated, a plug (not shown) would have to be put in that access hole 101 to maintain a vacuum in the housing 83.

FIGS. 14A and 14B show the assembly 101, comprised of the mirror rail assembly and the objective mirrors 43 and 44 and field mirror 45, that would be contained inside the housing 83 (FIG. 12). More specifically, FIG. 14A shows a top view of the assembly 101 (with a top rail removed), while FIG. 14B shows a side view of the assembly 101.

The top rail 103 and the bottom rail 105 are shown in the side view of FIG. 14B. These top and bottom rails 103 and 105 are just small aluminum bars that are attached to front and rear rail mounts 107 and 109 to hold the assembly 101 together.

Objective mirror mounts 111 for the objective mirrors 43 and 44 are attached with screws 112 to the rear rail mount 109 to hold the objective mirror mounts 111 in place, while a field mirror mount 113 for the field mirror 45 is attached with screws 114 to the front rail mount 107 to hold the field mirror mount 113 in place. The rail mounts 107 and 109 are held in place by the top and bottom rails 103 and 105. Then the objective mirrors 43 and 44 are attached to the objective mirror mounts 111 with small aluminum mirror clamps 110, while the field mirror 45 is attached to the field mirror mount 113 with a small aluminum mirror clamp 117. The mirrors 43, 44 and 45 can be positioned to change the number of passes (or reflections) through the multi-pass reflection filter 53 (FIG. 9) by adjusting the adjustment screws 115 found on the rail mounts 107 and 109.

It should be noted at this time that, in the side view of FIG. 14B, only one of the objective mirrors 43 and 44 can be seen because the objective mirrors 43 and 44 are lined up with one behind the other. However, there are two objective mirrors 43 and 44 in the assembly 101, as can be seen in the top view of FIG. 14A. Also note that the top rail 103 (FIG. 14B) has been removed from the top view of FIG. 14A to enable the viewer to see what is underneath that top rail 103 in FIG. 14A.

Figure 15:
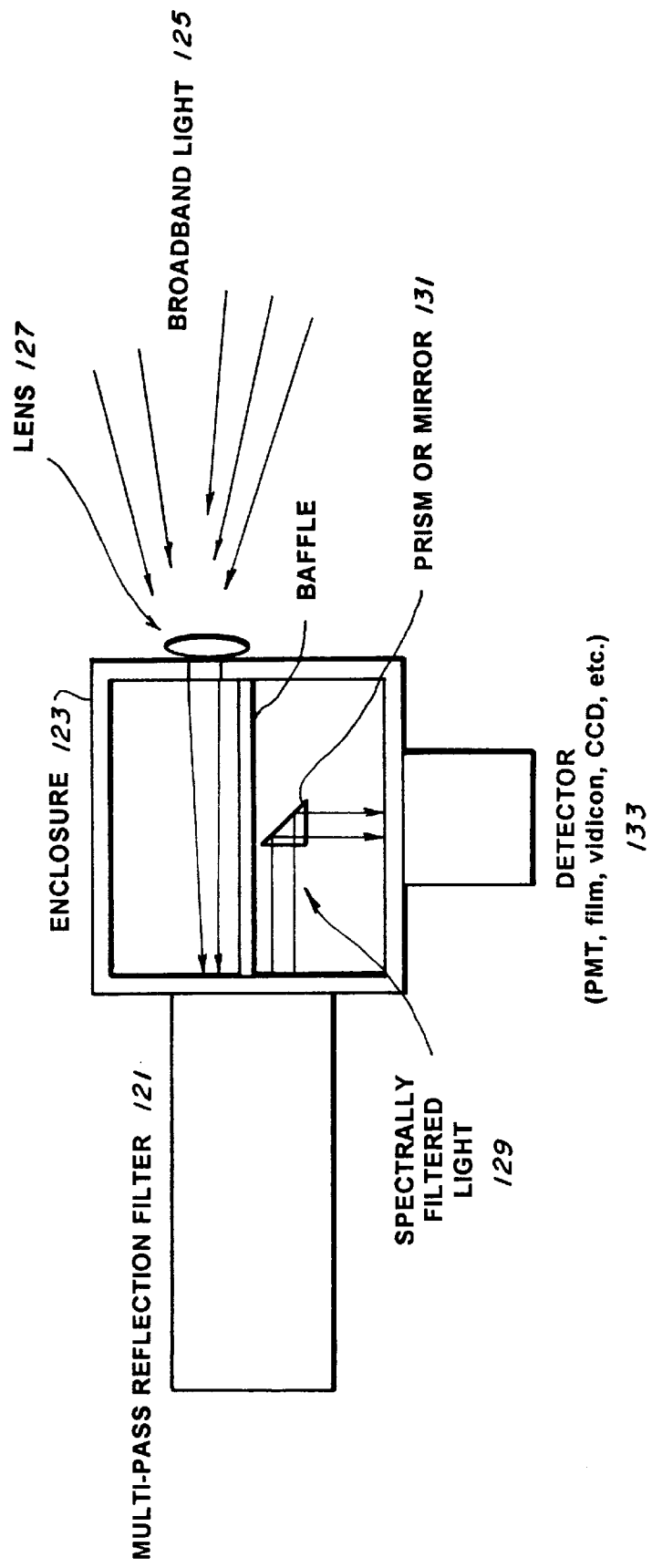
FIG. 15 is a schematic block diagram of a practical filtering application of the invention.

Referring now to FIG. 15, a schematic diagram of a practical real filtering application of the invention is shown. A multi-pass reflection filter 121 of the invention is shown as a black box because all of the details of the invention have already been thoroughly disclosed up to this point and require no additional description or drawings.

As shown in FIG. 15, a light-tight enclosure 123 is attached to the front of the multiple-pass reflection filter 121. Input broadband light 125 is collected by a lens 127, having an appropriate f-number, and imaged through the enclosure 123 and into the multi-pass reflection filter 121 through an entrance aperture (such as the entrance aperture 97 in FIG. 13B). This broadband light 125 is filtered by the multiple-pass reflection filter 121, and the spectrally filtered light 129 exits the multi-pass reflection filter 121 through an exit aperture (such as the exit aperture 99 in FIG. 13B).

The spectrally filtered light from the exit aperture is then reflected by a prism or mirror 131 into a photodetector 133 (or phototomultiplier tube, film, vidicon, CCD camera, avalanche photodiode, etc) to provide information representative of the transmission characteristics of the multi-pass reflection filter device being used.

ADVANTAGES AND NEW FEATURES OF THE INVENTION

The object of this invention is to provide an improved bandpass filter to be used in spectral filtering applications for which high transmission of the passband wavelengths and excellent rejection of the off-band wavelengths are required.

The most significant advantage of this invention over previous reflection filters is the ability to obtain a high number of multiple reflections using only three mirrors in a small package. Previous reflection filters utilizing planar front surface mirrors could only achieve one reflection per surface.

The reflection filter of this invention can transmit the image of a light source. The transmitted image could be detected with an appropriately positioned sensitive detector or array of detectors.

A second significant advantage the filter of this invention has over previous reflection filters, as well as interference type filters, is that the filter has a relatively wide field of view. As discussed before, the field of view of interference filters is only a few degrees. Any deviation from collimated incident light yields degradation of performance, both in terms of decreasing the transmission at the pass band and increasing the transmission in the off-band. Previous reflection filters using plane mirrors also had zero field of view. The field of view of this invention is determined by the f/number of the spherical mirrors used and can be quite high (tens of degrees) without the use of special collection optics.

The multiple-pass reflection filter of this invention is capable of achieving rejected light levels that are unmatched by any other known filter. Stringent filtering applications that require elimination of essentially all of the off-band light ($T<10^{-20}$) are feasible with this filter. For such an application, if scattered light presents a problem, it can be minimized by evacuating the interior of the package containing the filter optics to remove any dust particles or other scattering centers.

The multiple-pass reflection filter of this invention will operate over a wide range of environmental conditions, including extremes of temperature and humidity.

Therefore, what has been described is a multiple-pass reflection filter which provides spectral bandpass filtering of ultraviolet, visible and infrared radiation with a very high transmission of wavelengths within a selected passband coupled with exceptional off-band rejection.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by Letters Patent of the United States is:

1. A multi-pass reflection filter system for substantially passing therethrough only light having wavelengths within a preselected bandwidth of interest from an incident beam of broadband light and substantially rejecting all other wavelengths in the incident light beam, said reflection filter system comprising:

a plurality of dielectric-coated mirrors arranged in a desired configuration for substantially enabling only light having wavelengths within the preselected bandwidth to be selectively reflected back and forth off said mirrors along an optical path through said reflection filter system, each of said dielectric-coated mirrors comprising:
 a light-absorbing substrate for absorbing light incident thereon; and
 a dielectric coating disposed on said substrate, said dielectric coating being reflective at the preselected bandwidth of interest and substantially transmissive to all other wavelengths within the incident light beam to enable said substrate to absorb light at other wavelengths;
 said dielectric-coated mirrors collectively operating to reflect light within the preselected bandwidth along the optical path through the reflection filter system and to absorb light at other wavelengths.

2. The multi-pass reflection filter system of claim 1 wherein said plurality of dielectric-coated mirrors is comprised of:
 a concave reflective field mirror; and
 first and second concave objective mirrors aligned side-by-side on an axis and in a confronting relationship to said field mirror to form a White Cell configuration.

3. The multi-pass reflection filter system of claim 1 further including:
 a housing substantially enclosing said plurality of dielectric-coated mirrors, said housing having an entrance aperture for admitting the incident light beam to a first end of the optical path and an exit aperture for allowing light having wavelengths within the preselected bandwidth to pass from a second end of the optical path.

4. The multi-pass reflection filter system of claim 3 further including:
 means for selectively positioning said dielectric-coated mirrors to change the number of reflections through said housing.

5. The multi-pass reflection filter system of claim 3 further including:
 output means adjacent said exit aperture of said housing being responsive to light within the preselected bandwidth passing from the second end of the optical path for detecting and measuring that light from said housing.

6. The multi-pass reflection filter system of claim 3 further including:
 means coupled to said housing for evacuating air from said housing to substantially eliminate any dust particles in the air so that they will not cause scattering of the light being filtered by said multi-pass reflection filter system.

7. The multi-pass reflection filter system of claim 5 wherein said plurality of dielectric-coated mirrors is comprised of:
 a concave reflective field mirror; and
 first and second concave objective mirrors aligned side-by-side on an axis and in a confronting relationship to said field mirror to form a White Cell configuration.

8. The multi-pass reflection filter system of claim 1 further including:
 means for selectively positioning said dielectric-coated mirrors to change the number of reflections along the optical path through said multi-pass reflection filter system.

9. The multi-pass reflection filter system of claim 1 further including:
 means coupled to said plurality of dielectric-coated mirrors for changing the angular position of said mirrors to adjust the number of reflections of the light back and forth off said mirrors along the optical path through said reflection filter system.

10. The multi-pass reflection filter system of claim 1 wherein:
 each of said dielectric coatings has at least one wavelength range of high reflectivity and at least one wavelength region of high transmission outside the wavelength range of high reflectivity.

11. The multi-pass reflection filter system of claim 1 wherein:

each said light-absorbing substrate is comprised of an opaque black glass.

12. The multi-pass reflection filter system of claim 1 wherein:

each of said dielectric-coated mirrors is a spherical mirror fabricated using opaque black glass for said substrate and coated with said reflective dielectric coating.

13. A method for making a multi-path optical reflection filter for separating a bandwidth of interest from an incident beam of light, said method comprising the steps of:

selecting a plurality of light-absorbing substrates;

depositing on each of the light-absorbing substrates a reflective dielectric coating that is reflective at the bandwidth of interest and transmissive at other wavelengths within the incident beam of light; and arranging the dielectric-coated substrates in a desired configuration so that only light within the bandwidth of interest can be reflected back and forth along an optical path among the plurality of dielectric-coated substrates.

14. The method of claim 13 wherein:

said selecting step includes the step of selecting a plurality of opaque black glass substrates.

* * * * *